United States Patent

[11] 3,607,942

| [72] | Inventor | Ralph Lawrence Rowland |
| | | Winston-Salem, N.C. |
| [21] | Appl. No. | 727,691 |
| [22] | Filed | May 8, 1968 |
| [45] | Patented | Sept. 21, 1971 |
| [73] | Assignee | R. J. Reynolds Tobacco Company |
| | | Winston-Salem, N.C. |

[54] SYNTHESIS OF 1-HYDROXY-4-KETO-α-IONONE
3 Claims, No Drawings

[52] U.S. Cl. .................................................. 260/587,
260/514 R, 260/586 R
[51] Int. Cl. ........................................................ C07c 49/60
[50] Field of Search.......................................... 260/586,
587

[56] References Cited
OTHER REFERENCES

Ohloff et al., " Justus Leibigs Annalen" Bd. 652, pp. 115-126 [1962].

Mousseron-Canet, " C. R. Acad. Sc. Paris," + 262 pp. 1397- 1400 série C, (1966)

*Primary Examiner*—Bernard Helfin
*Assistant Examiner*—Norman P. Morgenstern
*Attorney*—Pendelton, Neuman, Williams & Anderson ABSTRACT: Air oxidation of 4-keto-α-ionone on solid surfaces to produce 4-(1-hydroxy-4-oxo-2,6,6-trimethyl-2-cyclohexene-1-yl)-3-butene-2-one.

3,607,942

SYNTHESIS OF 1-HYDROXY-4-KETO-α-IONONE

This invention relates to a method of synthesizing 4-(1-hydroxy-4-oxo-2,6,6-trimethyl-2-cyclohexene-1yl)-3-butene-2-one.

In the copending application of Ralph Lawrence Rowland and Donald L. Roberts, Ser. No. 533,839, filed Mar. 14, 1966, now U.S. Pat. No. 3,410,908, there is disclosed the novel compound 4-(1-hydroxy-4-oxo-2,6,6-trimethyl-2-cyclohexene-1-yl)-3-butene-2-one (which compound can also be designated 1-hydroxy-4-keto-α-ionone). This compound finds particular utility in the preparation of the plant hormone abscisic acid, which chemically is 3-methyl-5-(1-hydroxy-4-oxo-2,6,6-trimethyl-2-cyclohexene-1-yl)-cis, trans-2,4-pentadienoic acid. The use of 1-hydroxy-4-keto-α-ionone in the preparation of abscisic acid is disclosed in the said copending application and the disclosure therein is incorporated by reference herein.

It has now been found that 4-keto-α-ionone can be oxidized by air when the compound is contacted with selected solid surfaces, especially solid surfaces which are basic in character. Air oxidation of 4-keto-α-ionone in this manner produced 1-hydroxy-4-keto-α-ionone. The synthesis is particularly advantageous and convenient to conduct. Thus, the 4-keto-α-ionone dissolved in a suitable solvent such as, for example, hexane, pentane, benzene, ether, chloroform and the like is adsorbed on the surface of a solid adsorbent and air passed through the system to accomplish the desired conversion. The period required for the conversion varies depending upon the activity of the solid adsorbent employed, but in general air oxidation is carried out for a period ranging from about 5 to 30 hours. The air oxidation can be conducted at ambient temperatures and the oxidized product eluted from the surface of the solid adsorbent using eluants such as ether, chloroform, methyl alcohol, ethyl alcohol, and mixtures thereof.

The air oxidation can be accomplished by bubbling air through a mixture consisting of 4-keto-α-ionone, a solid adsorbent, and a suitable organic liquid.

The solid adsorbent employed for the synthesis of the invention is one which is basic in character. A solid which is basic in character is a solid which, by its intrinsic character or by possession of surface sites or by adsorption of surface groups acts as an electron donor in reaction with acids (i.e., Lewis Base) or a solid which, in the presence of water, functions in the production of hydroxide ions. Not all solid adsorbents promote the air oxidation of 4-keto-α-ionone to 1-hydroxy-4-keto-α-ionone. Representative of the basic adsorbents which do promote the desired oxidation are alumina (aluminum oxide), magnesia (magnesium oxide), zinc oxide, calcium oxide, titanium dioxide, activated carbon and the like.

The synthesis of the present invention is further illustrated by the following specific examples.

EXAMPLE 1

A solution of 1.034 grams of 4-keto-α-ionone in 15 milliliters of ether was added to a column of alumina (25 mm. diam. x 210 mm. height). Several 5-milliliter portions of ether were used to rinse the sample downward onto the adsorbent. After using a slight vacuum to pull dry air through the column for 18 hours, the organic material was eluted from the alumina with 200 milliliters of 4:1 chloroform-methyl alcohol. Concentration of the eluate gave a residue of 0.655 gram. The residue was identified as a mixture of 1-hydroxy-4-keto-α-ionone (29 percent by weight), 4-keto-α-ionone (35 percent by weight), 7-hydroxy-4,4,7-trimethyl-4,6,7,8-tetrahydro-2(3H)-naphthalenone (25 percent by weight) and 4,4,7-trimethyl-3,4-dihydro-2(1H)-naphthalenone (4 percent by weight).

EXAMPLE 2

X was deactivated in the following manner. Alumina (356 g.) was spread onto a tray (14"x18") and was allowed to stand for one hour with occasional respreading. The alumina was then placed in a stoppered flask with 12 milliliters of water, was shaken thoroughly, and was allowed to stand at least 16 hours before use.

To a column (15 mm. diam. × 300 mm. height) of deactivated alumina was added a solution of 0.980 gram of 4-keto-α-ionone in 25 milliliters of ether. After air of laboratory humidity was pulled through the column for 23 hours, the organic material was eluted with 100 milliliters of 4:1 chloroform-methyl alcohol. Concentration of the eluate at reduced pressure gave a residue of 0.967 gram. The residue consisted of 1-hydroxy-4-keto-α-ionone (70 percent by weight), 4-keto-α-ionone (15 percent by weight), and 4,4,7-trimethyl-3,4,-dihydro-2(1H)-napthalenone (15 percent by weight).

EXAMPLES 3–10

Varied solids were used as adsorbents for air oxidation of 4-keto-α-ionone by the procedure of Example 1, with the exception that (1) the 4-keto-α-ionone was added to zinc oxide in a chloroform solution and (2) elution of the reaction mixture from magnesium oxide, barium oxide and bismuth trioxide was accomplished using chloroform while elution from ferric oxide was accomplished using 4:1 ether-methyl alcohol. The results are tabulated as follows:

| Adsorbent | Time of air flow, hours | Recovery of 4-keto-α-ionone | Percent conversion to 1-hydroxy-4-keto-α-ionone |
|---|---|---|---|
| Zinc oxide | 22 | 95 | 4 |
| Titanium dioxide | 22 | 84 | 6 |
| Calcium oxide | 22 | 84 | 11 |
| Magnesium oxide | 17 | 39 | 43 |
| Activated carbon | 22 | 81 | 9 |
| Barium oxide | 23 | 91 | 4 |
| Bismuth trioxide | 23 | 95 | 3 |
| Ferric oxide | 24 | 73 | 8 |

EXAMPLE 11

A dilute hexane solution of 4-keto-α-ionone was added to a column of deactivated alumina and the column was rinsed with hexane. Flow of air through the alumina column which had adsorbed the 4-keto-α-ionone resulted in oxidation to yield 1-hydroxy-4-keto-α-ionone.

EXAMPLE 12

A solution of 2.1 grams of 4-keto-α-ionone in 900 milliliters of hexane was stirred for 1 hour with 76 grams of deactivated alumina. The alumina was separated by filtration and air was allowed to flow through the filter bed for 20 hours. Washing of the alumina with a 4:1 chloroform-methyl alcohol mixture followed by concentration of the washings at reduced pressure yielded a residue of 1.7 grams. Vapor-phase chromatographic analysis showed that the residue contained more than 85 percent 1-hydroxy-4-keto-αchromatographic analysis showed that the residue contained more

EXAMPLE 13

A solution of 0.273 gram of 4-keto-α-ionone in 50 milliliters of benzene was stirred at room temperature while air was bubbled through the solution for 48 hours. Unreacted 4-keto-α-ionone was recovered quantitatively by concentration under reduced pressure.

A mixture of 120 milliliters of benzene, 0.9 gram of 4-keto-α-ionone and 20 grams of alumina was stirred at room temperature for 4.5 hours with air bubbled through the mixture. The alumina was separated by filtration and was washed with 100 milliliters of 9:1 ether-methyl alcohol. Concentration of the combined filtrate and washings yielded 0.65 gram of 4-keto-α-ionone and 0.11 gram of 1-hydroxy-4-keto-α-ionone.

EXAMPLE 14

Oxidation was accomplished over a temperature range using the procedure of Example 2 with alumina as the adsorbent: at −6° C., 1-hydroxy-4-keto-α-ionone was obtained in 26 percent conversion with 66 percent recovery of 4-keto-α-ionone after 21.5 hours of air flow; at 50–62° C., with an air flow of 4 hours, 1-hydroxy-4-keto-α-ionone was obtained in 32 percent conversion with 20 percent recovery of 4-keto-α-ionone; at 90° C., with air flow for 2 hours, 1-hydroxy-4-keto-α-ionone was obtained in 3 percent yield and a mixture of 70:30:3 chloroform-methyl alcohol-water was used to elute the product.

Those modifications and equivalents which fall within the spirit of the invention and the scope of the appended claims are to be considered part of the invention.

I claim:

1. A process for preparing 4-(1-hydroxy-4-oxo-2,6,6-trimethyl-2-cyclohexene-1-yl)-3-butene-2-one which comprises adsorbing 4-keto-α-ionone on the surface of a basic solid adsorbent and passing air over said surface containing the 4-keto-α-ionone to form 4-(1-hydroxy-4-oxo-2,6,6-trimethyl-2-cyclohexene-1-yl)-3-butene-2-one, said basic solid adsorbent being selected from the group consisting of metal oxides and activated carbon.

2. A process in accordance with claim 1 wherein the basic solid adsorbent is selected from the group consisting of alumina, magnesium oxide, zinc oxide, titanium oxide, calcium oxide; activated carbon; barium oxide; bismuth trioxide and a ferric oxide.

3. A process for preparing 4-(1-hydroxy-4-oxo-2,6,6-trimethyl-2-cyclohexene-1-yl)-3-butene-2-one which comprises bubbling air through a mixture consisting of 4-keto-α-ionone, a basic solid adsorbent and an organic solvent for 4-keto-α-ionone, said basic solid adsorbent being selected from the group consisting of metal oxides and activated carbon.

UNITED STATES PATENT OFFICE
CERTIFICATE OF CORRECTION

Patent No. 3,607,942                     Dated September 21, 1971

Inventor(s)    Ralph Lawrence Rowland

It is certified that error appears in the above-identified patent and that said Letters Patent are hereby corrected as shown below:

Column 1, line 70, "x" should be -- Alumina --

Column 2, line 54, after "α" insert -- -ionone. -- and delete the remainder of the line.

Column 2, line 55, delete the entire line.

Column 4, line 8, after "oxide" (first occurrence), "carbon" and "oxide" (second occurrence) delete the semi-colons (;) and insert commas (,).

Signed and sealed this 14th day of March 1972.

(SEAL)
Attest:

EDWARD M. FLETCHER, JR.
Attesting Officer

ROBERT GOTTSCHALK
Commissioner of Patents